Aug. 10, 1965            JEAN-FELIX PAULSEN            3,199,313
                         RESILIENT COUPLINGS
                         Filed Aug. 15, 1963
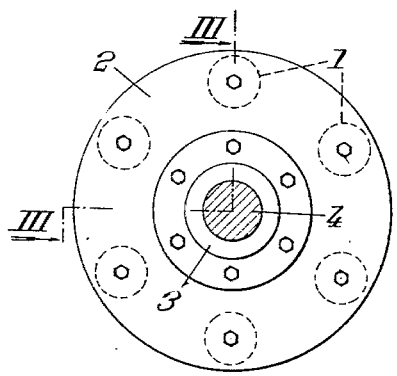
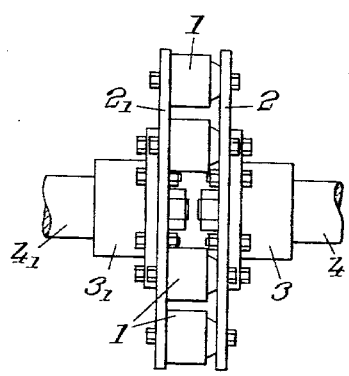
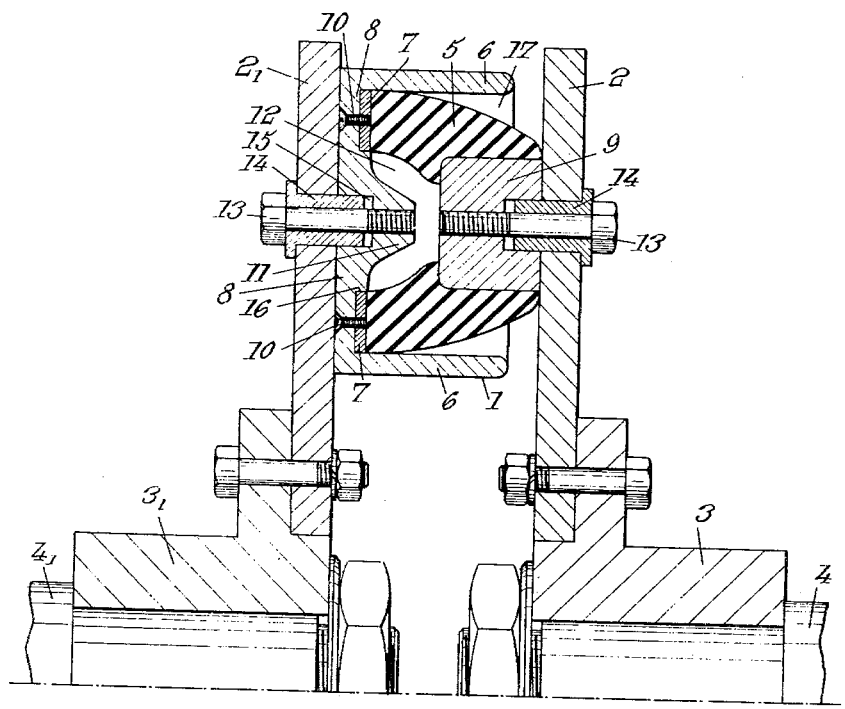
INVENTOR
BY
ATTORNEY 3,199,313
RESILIENT COUPLINGS
Jean-Félix Paulsen, Paris, France, assignor to Société Luxembourgeoise de Brevets et de Participations (Lubrepa), Luxembourg, Luxembourg, a society of Luxembourg
Filed Aug. 15, 1963, Ser. No. 302,375
Claims priority, application France, Sept. 10, 1962, 909,069
2 Claims. (Cl. 64—11)

The present invention relates to resilient couplings, in particular for transmitting high efforts (as it is for instance the case for the coupling devices to be used in connection with rolling mills), which comprise two rotating parts, in particular two annular plates, rigid with the driving and the driven shafts to be coupled together by means of resilient blocks of substantially pyramidal or conical shape.

The object of the present invention is to provide a coupling device of this kind which is better adapted to meet the requirements of practice, in particular concerning the resiliency of transmission and the facility of mounting the elements or blocks together.

According to the present invention the resilient blocks are hollow at least on the side of the larger base thereof.

According to another feature of the invention the resilient blocks are mounted in such manner on said plates carried by the respective shafts that they can be removed without having to move said plates away from each other.

According to still another feature of the invention there is provided, on the plate to which each of the blocks is secured, a projection penetrating into said block, and in particular occupying a portion of the empty volume provided therein.

Preferred embodiments of the present invention will be hereinafter described with reference to the appended drawings, given merely by way of example, and in which:

FIG. 1 is an elevational view of a coupling device made according to the invention;

FIG. 2 is a side view of this device;

FIG. 3 shows, on an enlarged scale, in axial section, a coupling device of the same kind.

Two annular plates 2, $2_1$ are secured to sleeves 3, $3_1$ of two shafts 4, $4_1$, respectively, and it is desired to couple these shafts through a multiplicity of resilient means 1.

The coupling device comprises the known combination of resilient blocks 5 (FIG. 3), for instance of pyramidal or conical shape (advantageously with curvilinear generatrices), cooperating with bell-shaped elements 6 fixed to plate 21. The whole is such that, said blocks being connected, through their larger base and their smaller base, respectively to plates 2 and $2_1$, the relative movements of said plates under the action of the forces to be transmitted have for their effect to deform the resilient material (rubber for instance) until the lateral surface of each of said blocks bears against the inner surface of the corresponding bell-shaped element 6.

According to the present invention, said blocks 5, are of hollow shape, preferably on the side where they are fixed to said bell-shaped elements 6, such an arrangement having, as it will be hereinafter explained, various advantages and in particular ensuring a good axial resiliency and facilitating the mounting.

According to an embodiment of the invention, the blocks are made as shown by FIG. 3.

Every block 5 is in the form of a hollow resilient body, of revolution, adapted to be secured, on the one hand, on the side of its larger base, to an annular metal plate 7 serving to the fixation of said block 5 to the bottom 8 of a bell-shaped element 6, respectively, and, on the other hand, on the opposite side, to a central metal piece 9, of cylindrical shape engaged in a corresponding recess of block 5, said part 9 being secured to the other plate 2.

On the side of bell-shaped element 6, the fixation between plate 7 and the bottom 8 of said element 6 is effected by means of screws 10, whereas the fixation between this bottom 8 and plate $2_1$ is ensured by means of screws passing through a threaded projection 11 of bottom 8, said projection penetrating into the recess 12 provided in resilient block 5. Such an arrangement ensures a better transmission of stresses.

For instance, as shown, a screw 13 cooperating with a centering sleeve 14 projects into a recess 15 of bottom 8, in such manner as to avoid dangerous shearing stresses being exerted on the metal.

On the other side, that is to say between part 9 and plate 2, similar means 13, 14 are used.

Anyway, the heads of the screws are disposed on the accessible outer sides of plates 2, $2_1$, whereby it is possible, by unscrewing screws 13, to remove elastic blocks 5 and bell-shaped elements 6 without having to move plates 2 and $2_1$ away from each other.

In the bottom 8 of every bell-shaped element there is provided a centering groove 16 to accommodate plate 7.

Anyway it will be noted that, once the parts have been assembled together, there remains, between the external surface of rubber blocks 5 and the inner wall of bell-shaped elements 6, free spaces 17 permitting free deformation of rubber under the action of the forces transmitted from one shaft to the other.

Such a system has the following characteristics and advantages.

Under the effect of the torque that is transmitted, blocks 5 are deformed until they come to bear against the inner walls of bell-shaped elements 6. As a consequence, under normal working conditions, there is a great twisting resiliency favorable to a good protection of the machines coupled together by means of the system against shocks and vibrations, the amplitude of the deformations of the rubber material being however limited by the action of the bell-shaped element.

On the other hand, the coupling device has a good resiliency in the radial direction, that is to say in any direction perpendicular to the shafts, which permits of remedying small defects in radial alinement (shafts 4 and $4_1$ remaining parallel to each other) without an excessive radial overcharge of the bearings.

Furthermore, for both kinds of deformations, the resilient reaction gradually increases with the deformation since, for any relative displacement in a direction perpendicular to the common axis of the shafts, the side of the rubber blocks 5 is gradually applied against the inner walls of the bell-shaped elements 6, thus ensuring a gradual compression of rubber between every part 9 and every bell-shaped element 6 as soon as the amplitude reaches sufficiently great values.

Furthermore the following advantages are obtained.

Owing to the presence of recess 12, there is obtained a considerable increase of the resiliency (which may exceed a ratio of 1 to 3). In these conditions, an axial relative displacement of the shafts (for instance under the effect of thermal expansion or of a shell or frame deformation) produces a much lower axial reaction of the rubber material, which does not risk deteriorating the bearings of the shafts.

In a likewise manner, in some cases and in particular at high speeds, the action of the overhanging centrifugal force on parts 6 and 9 tends to deform plates 2 and $2_1$ into the shape of cups, which has for its effect to transmit traction stresses to the rubber blocks. Now, due to their greater axial resiliency, the corresponding traction effort may be reduced to acceptable values.

The fixation by means of sleeves such as 14 permits of protecting bolts 13 against shearing and bending stresses, which may be very high, in particular due to the centrifugal force at high speed, since the efforts then applied may reach values much higher than those resulting from the torque transmisison between shafts 4 and $4_1$.

This arrangement makes the individual mounting and removal of the blocks particularly simple and quick. For removal for instance it suffices to unscrew screws 13 and to remove sleeves 14. The rubber blocks can then be removed radially, without having to displace the machines coupled together, which is a very great advantage because this type of coupling is generally applied to powerful machines, often heavy and cumbersome.

It should be reminded that, in a known arrangement, radial removal was made possible by radial notches provided in plates 2 and $2_1$. This solution had the drawback of weakening the peripheral portion of said plates, just in the area where they may have to undergo important bending stresses under the action of the centrifugal force, chiefly at high speeds.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. For use between two coaxial shafts, a resilient coupling device which comprises, in combination, two plates, a first one and a second one, coaxially rigid with said shafts respectively and facing each other, an annular row of bell-shaped elements carried by said first plate, with their open ends turned toward said second plate, means for securing said bell-shaped elements to said first plate, an annular row of blocks of a resilient material interposed between said plates for coupling them together, said blocks being all of at least substantially frusto-conical shape with their respective axes parallel to the common axis of said shafts, said blocks being hollowed out starting from the respective larger bases thereof and at a sufficient depth toward the smaller bases so as to confer to said blocks an axial resiliency sufficient to compensate axial relative displacements of the shafts, said blocks being secured by the part of said larger bases surrounding the hollow to the inner walls of the closed ends of said bell-shaped elements, respectively, and means for fixing the smaller bases of said blocks with respect to said second plate.

2. For use between two coaxial shafts, a resilient coupling device which comprises, in combination, two plates, a first one and a second one, coaxially rigid with said shafts respectively and facing each other, a plurality of bell-shaped elements carried by said first plate and arranged on the latter in an annular row with their open ends turned toward said second plate, means for securing said bell-shaped elements to said first plate, the same number of metal members carried by said second plate and projecting inside of said bell-shaped elements, an annular row of blocks of a resilient material and having a frusto-conical shape with a large base and a smaller base adapted to connect said metal members and said bell shaped elements, each of said blocks having a recess in said small base adapted to engage said metal members, and each of said blocks having a hollow portion in the said large base, said hollow portion extending substantially to the metal member and said large base engaging inner walls of the bell-shaped elements at the closed end of said elements.

References Cited by the Examiner

UNITED STATES PATENTS

| 2,012,012 | 8/35 | Kitzman. | |
| 2,356,572 | 8/44 | Dornig | 64—14 |
| 2,497,623 | 2/50 | Nolen | 64—13 |
| 2,514,897 | 7/50 | Paulsen | 64—14 |

ROBERT C. RIORDON, *Primary Examiner.*